(12) United States Patent
Okamoto

(10) Patent No.: US 6,289,124 B1
(45) Date of Patent: Sep. 11, 2001

(54) METHOD AND SYSTEM OF HANDWRITTEN-CHARACTER RECOGNITION

(75) Inventor: Masayoshi Okamoto, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/298,989

(22) Filed: Apr. 26, 1999

(30) Foreign Application Priority Data

Apr. 27, 1998 (JP) .................................................. 10-117005
Jun. 18, 1998 (JP) .................................................. 10-171532

(51) Int. Cl.⁷ ...................................................... G06K 9/00
(52) U.S. Cl. .......................... 382/187; 382/190; 382/197; 382/209
(58) Field of Search ..................................... 382/181–190, 382/192, 195, 197, 201, 202, 206, 209, 217–219, 224

(56) References Cited

U.S. PATENT DOCUMENTS

| | | | |
|---|---|---|---|
| 4,653,107 | * 3/1987 | Shojima et al. | 382/189 |
| 4,757,551 | * 7/1988 | Kobayashi et al. | 382/170 |
| 4,813,078 | * 3/1989 | Fujiwara et al. | 382/185 |
| 4,989,258 | * 1/1991 | Takahashi et al. | 382/226 |
| 5,067,165 | * 11/1991 | Nishida | 382/195 |
| 5,303,381 | * 4/1994 | Yagasaki | 707/7 |
| 5,502,803 | * 3/1996 | Yoshida et al. | 707/530 |
| 5,533,147 | * 7/1996 | Arai et al. | 382/179 |
| 5,640,466 | * 6/1997 | Huttenlocher | 382/177 |
| 5,796,866 | * 8/1998 | Sakurai et al. | 382/187 |
| 5,970,170 | * 10/1999 | Kadashevich et al. | 382/187 |
| 6,052,482 | * 4/2000 | Arai et al. | 382/187 |
| 6,144,764 | * 11/2000 | Yamakawa et al. | 382/187 |
| 6,175,651 | * 1/2001 | Ikebata et al. | 382/187 |

FOREIGN PATENT DOCUMENTS 10-154206    6/1998 (JP) .

OTHER PUBLICATIONS

Masayoshi Okamoto et al; IEEE, 4th ICDAR; Aug. 18–20, 1997, pp.926–930.

Masaki Nakagawa; Journal of Information Processing, vol. 13, No. 1, 1990, pp. 15–34.

Toru Wakahara et al; IEICE Trans. Inf. & Syst., vol. E79–D, No. 5, May 1996; pp. 529–534.

Jun Tsukumo; IEICE Trans. Inf. & Syst., vol. E79–D, No. 5, May 1996; pp.411–416.

M. Hamanaka et al; IEEE, 2nd. ICDAR, Oct. 20–22, 1993; pp. 204–207.

Masaki Nakagawa et al; Proceedings of ICTP, 1983, pp. 191–196.

* cited by examiner

*Primary Examiner*—Matthew C. Bella
*Assistant Examiner*—Gregory Desire
(74) *Attorney, Agent, or Firm*—Armstrong, Westerman, Hattori, McLeland & Naughton, LLP

(57) ABSTRACT

In accordance with the present character recognition method, an imaginary stroke is used to link from the ending point of each actual stroke of an input handwritten character to the starting point of the subsequent actual stroke thereof to form a single line. Then a feature level is detected for specifying the position of a turn of the single line and the direction and angle of the turn at the position. According to the detected position of the turn, the detected feature level is patterned on input mesh memories which are in turn compared with a previously formed dictionary mesh memory to calculate the resemblance of the input handwritten character to each handwritten character in a dictionary database. The handwritten character in the dictionary database that has the closest, calculated resemblance is recognized as the input handwritten character. According to the present method, an imaginary stroke added to an input handwritten character also allows correct recognition of a character with each stroke written cursively.

60 Claims, 12 Drawing Sheets

METHOD AND SYSTEM OF HANDWRITTEN-CHARACTER RECOGNITION

BACKGROUND OF THE INVENTION

1. Field of the Invention

The present invention relates to methods and systems of recognizing handwritten characters.

2. Description of the Background Art

In recent years a pen rather than a keyboard has been used to input characters in portable information equipment and the like. For example, for a tablet with display and input devices integrated therein that is mounted, e.g., in a PDC, recognition rate of handwritten characters input thereto is an important factor in evaluating the value thereof as a product. Methods of such character recognition include comparing stroke coordinates of a handwritten character with a dictionary database, comparing the writing direction of a handwritten character as well as its originating order with a dictionary database.

In the former method of character recognition, all stroke coordinates must be subjected to the comparison. Thus an enormous amount of information must be processed particularly for characters which vary in stroke order and stroke number. This disadvantageously requires a large capacity of memory for the dictionary database and processing programs and also results in low processing speed.

In the latter method of character recognition, more specifically, the direction of each stroke of a handwritten character is detected with respect to the time at which the user starts to write it (or its originating order) and the detected direction is compared with the dictionary database in memory. The character in the dictionary database that best matches the input handwritten character is determined as a recognized character. While the latter method requires smaller memory capacity for the dictionary database and also provides faster processing speed than the former method, the character recognition rate of the latter method is significantly reduced for a character written in an incorrect stroke order, since the latter method refers to the writing time of the character to detect the writing direction of the character.

Japanese Patent Laying-Open No. 10-154206 discloses a method in which the level of a feature of each stroke's turn in a handwritten character is detected and compared with a dictionary database to identify the character. In accordance with this method the position and angle of each stroke's turn of a character are detected and compared with the dictionary database to identify the character. Thus the amount of information required for character recognition can be reduced and characters written in incorrect stroke orders can also be recognized correctly. However, the character recognition rate of this method is also degraded for cursive characters, since cursive characters have irregular turns caused depending on how the characters are written so that the positions of the turns cannot be detected correctly. This disadvantage is similarly found in the above-mentioned methods of comparing stroke coordinates and comparing writing directions.

SUMMARY OF THE INVENTION

One object of the present invention is to provide a character recognition method and system capable of rapidly and highly reliably recognizing characters including cursive characters while reducing the amount of information required for character recognition.

In one aspect of the present invention a method of recognizing input handwritten characters includes the steps of: linking from the ending point of each actual stroke of an input handwritten character to the starting point of the subsequent actual stroke of the input handwritten character with an imaginary stroke to form a single line; detecting the level of a feature for specifying a turn of the single line; comparing the detected feature level to each feature level of a plurality of handwritten characters in a previously prepared dictionary database to calculate the resemblance of the input handwritten character to each handwritten character in the dictionary database; and determining as the input handwritten character the handwritten character in the dictionary database having the closest, calculated resemblance. The feature preferably includes the position of the turn and still preferably includes the direction and angle of the turn.

In another aspect of the present invention a system recognizing input handwritten characters includes: a device forming a single line, linking from the ending point of each actual stroke of an input handwritten character to the starting point of the subsequent actual stroke of the input handwritten character with an imaginary stroke; a device detecting the level of a feature for specifying a turn of the single line formed by the forming device; a dictionary memory storing the levels of the feature of a plurality of handwritten characters of a dictionary database formed previously; a device comparing the feature level detected by the detecting device to each feature level of the plurality of handwritten characters in the dictionary database stored in the dictionary memory to calculate the resemblance of the input handwritten character to each handwritten character in the dictionary database; and a device determining as the input handwritten character the handwritten character in the dictionary database having the closest resemblance calculated by the comparing device. The feature preferably includes the location of the turn and still preferably includes the direction and angle of the turn.

The system still preferably includes a temporary memory including a plurality of spatial, input-feature storage regions. The plurality of spatial, input-feature storage regions are associated with a plurality of predetermined reference directions and store a feature level represented in directional change for specifying the angle of a turn. The dictionary memory includes a plurality of spatial, dictionary data feature storage regions associated with the plurality of reference directions and storing a feature level in directional change for specifying the angle of a turn of a handwritten character in the dictionary database. The detecting device stores a feature level in directional change into the temporary memory at the address corresponding to the detected position of a turn. The comparing device compares each spatial, input-feature storage region of the temporary memory with the associated spatial, dictionary data feature storage region of the dictionary memory.

Preferably the detecting device assumes both two of the plurality of reference directions adjacent to the direction of a turn as the direction of the turn. Still preferably the detecting device weights feature levels in directional change depending on the proximity of the both adjacent reference directions to the direction of the turn and stores the weighted feature levels in directional change into spatial, input-feature storage regions respectively associated with the both adjacent reference directions.

The above method and system link actual strokes of a handwritten character together using imaginary strokes and then detect the positions of turns in the character which are in turn compared with a dictionary database to identify the character. Thus the position of a turn of a cursively handwritten input character can also readily be associated with that of a turn of a handwritten character in the dictionary database to increase recognition rate. In addition to turn position, turn direction and turn angle can also be detected to further increase recognition rate.

Furthermore, turn direction can be normalized with respect to a plurality of predetermined reference directions to reduce the amount of information to be stored in the dictionary memory and also increase processing speed.

The foregoing and other objects, features, aspects and advantages of the present invention will become more apparent from the following detailed description of the present invention when taken in conjunction with the accompanying drawings.

Figure 1:
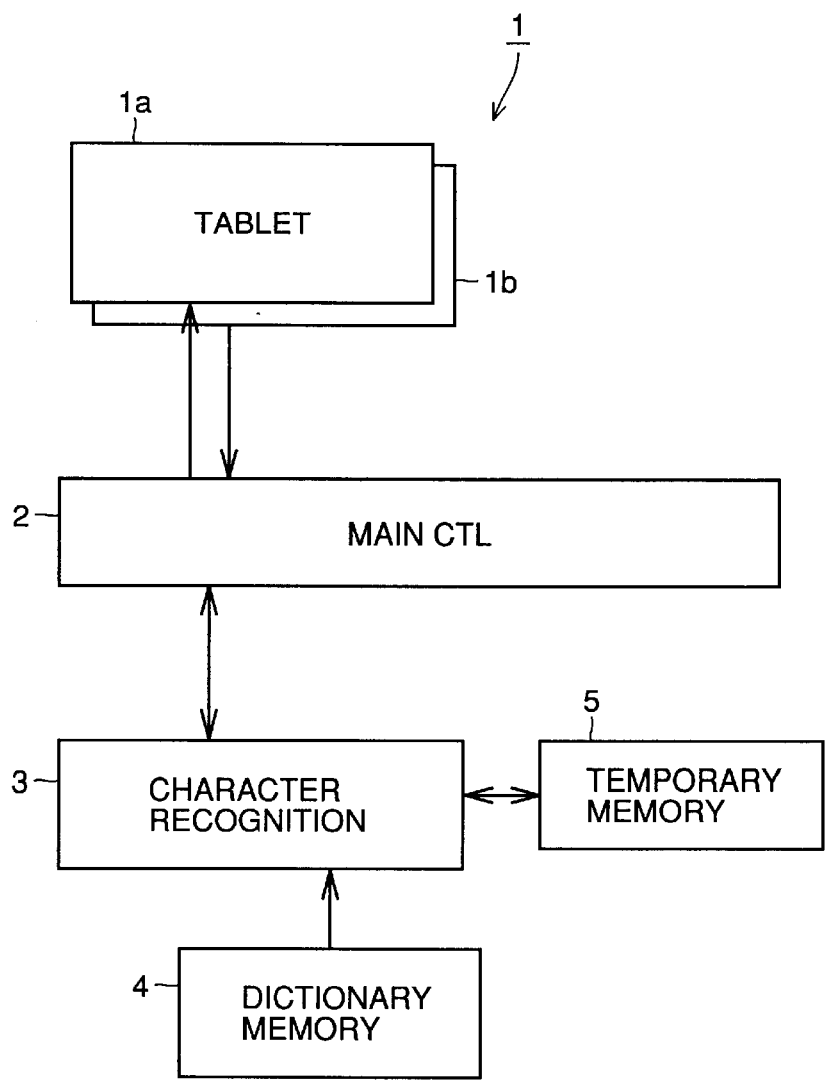
FIG. 1 is a functional block diagram showing the general configuration of a handwritten character recognition system of a first embodiment of the present invention.
Figure 3:
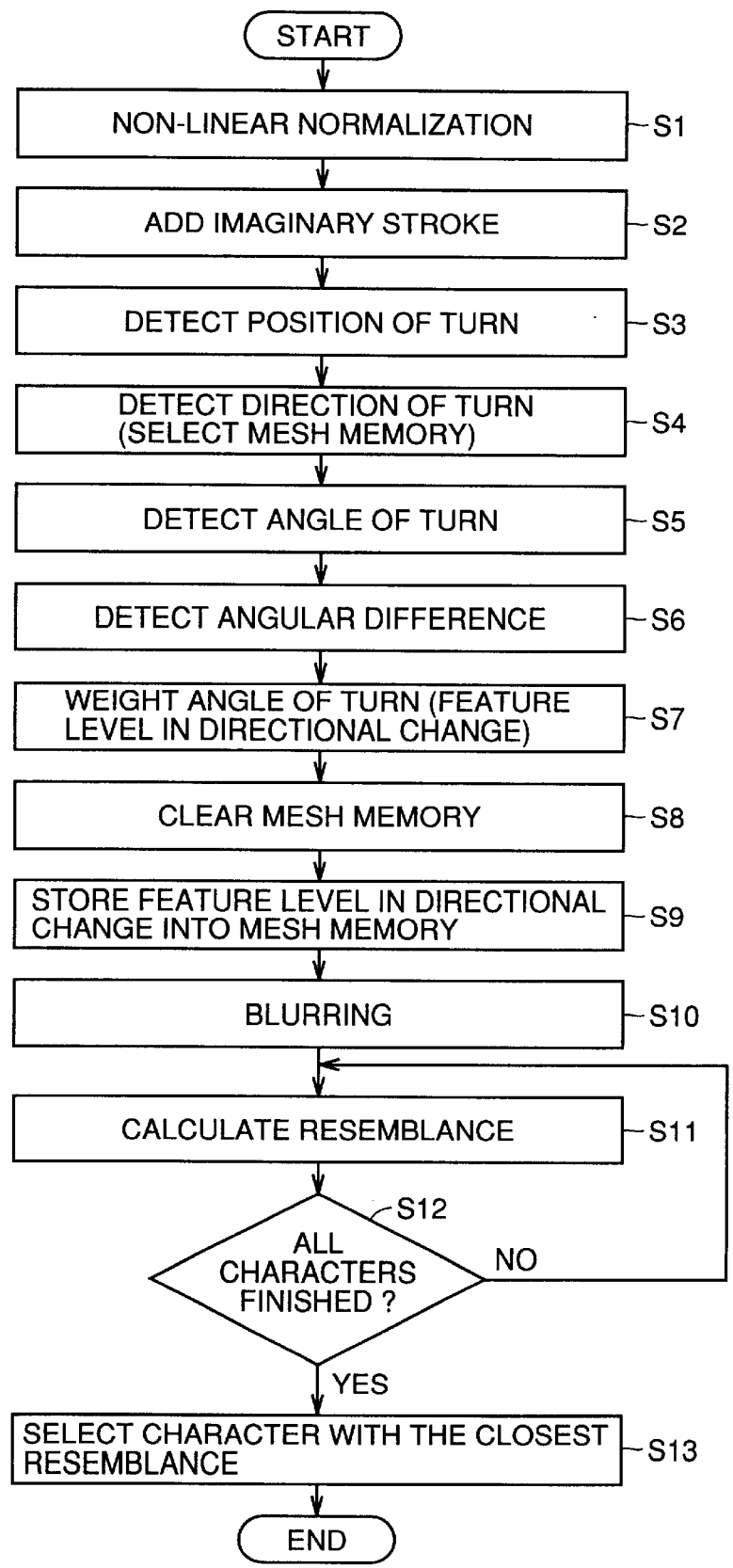
FIG. 3 is a flow chart of a program for allowing the FIG. 2 computer system to function as the FIG. 1 handwritten character recognition system.

FIG, 5 illustrates an operation of the FIG. 1 handwritten character recognition system according to the FIG. 3 program.

Figure 6:
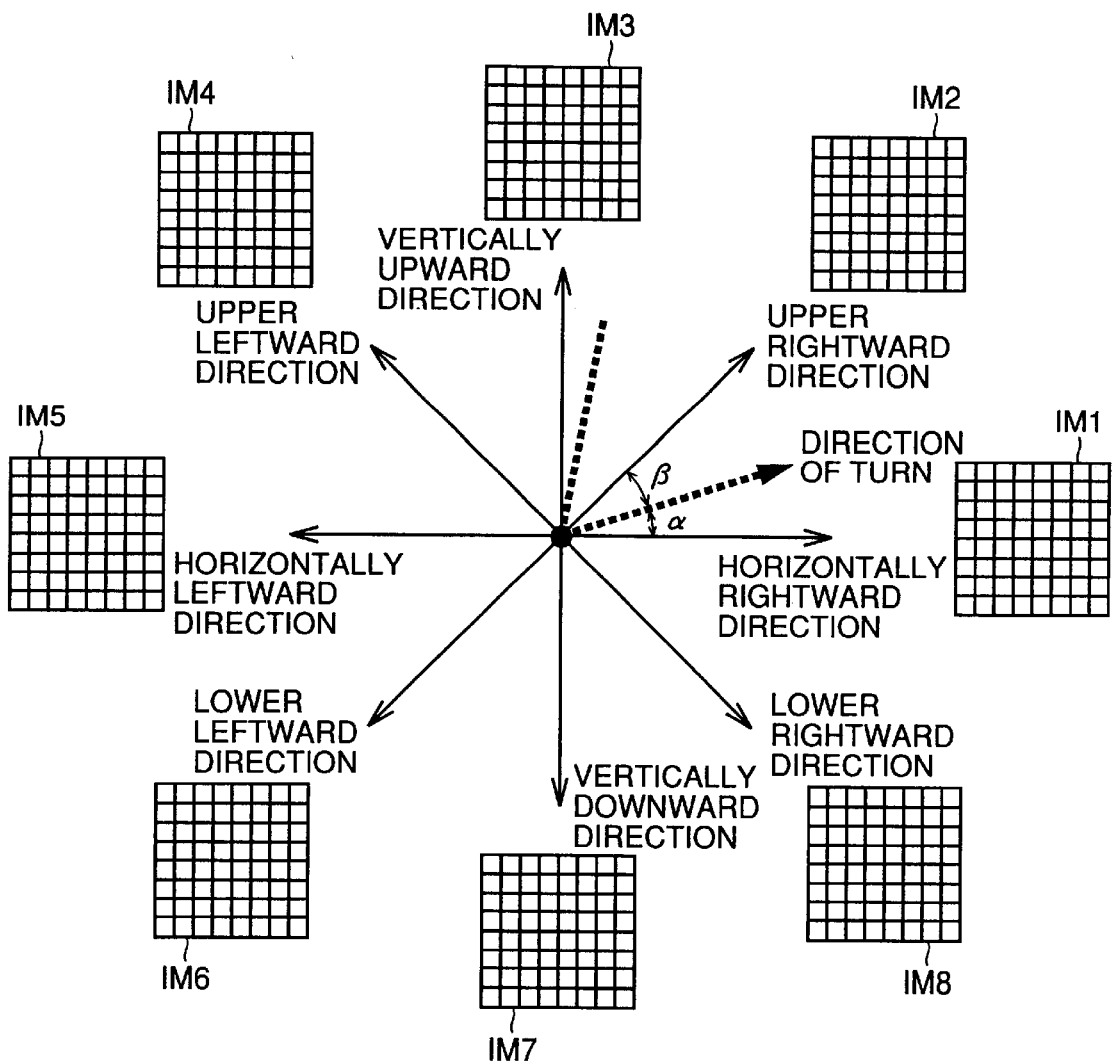

FIG. 6 illustrates eight different directions used in detecting the direction of a turn and input mesh memory used therefor in the FIG. 3 program.

Figure 7:
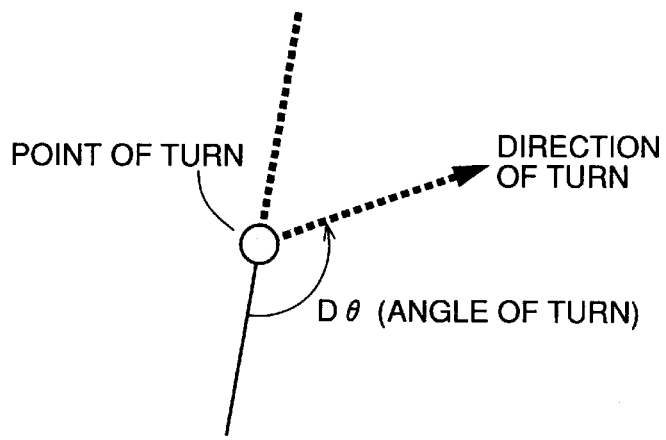

FIG. 7 shows the angle of a turn detected according to the FIG. 3 program.

Figure 8:
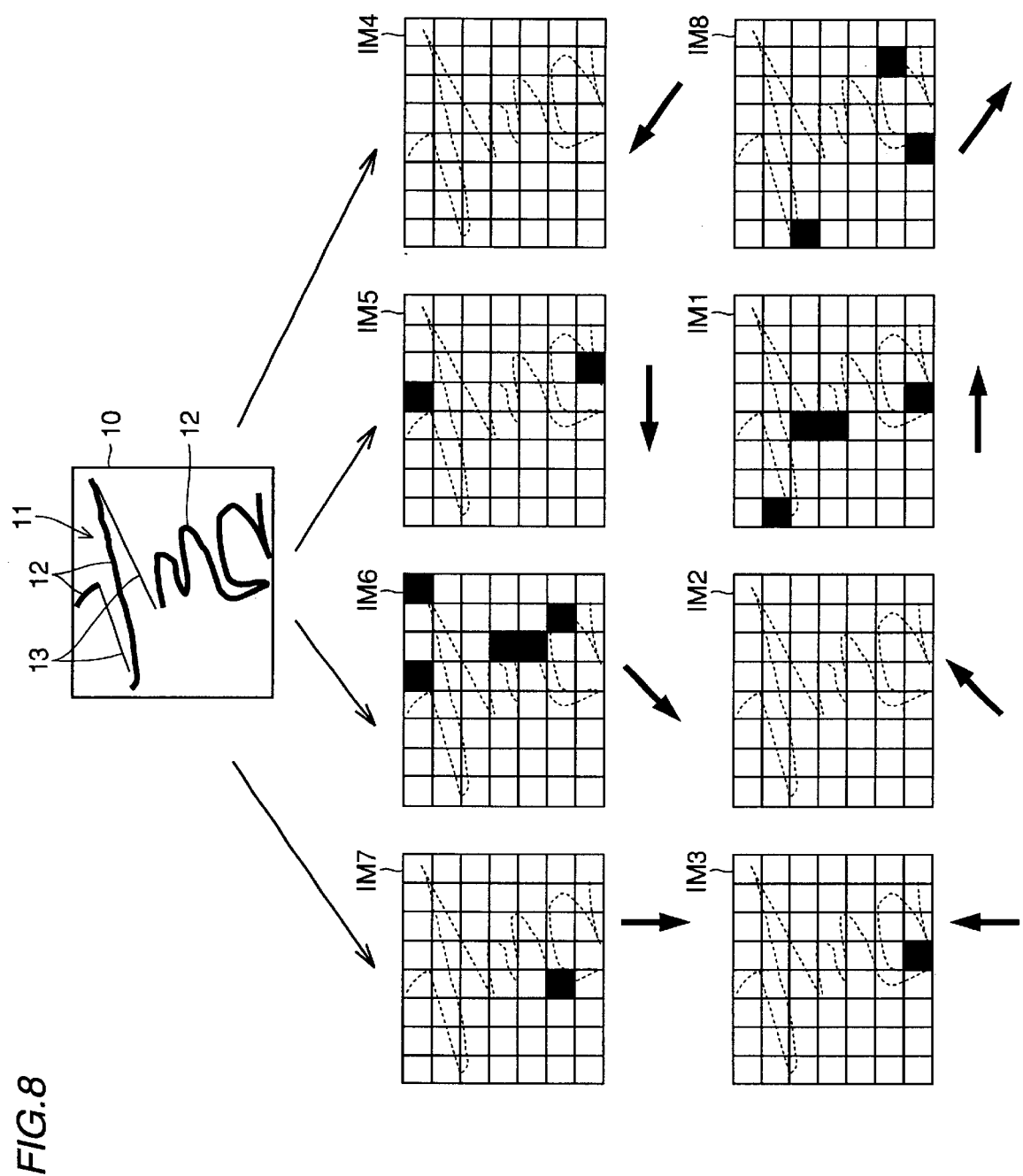

FIG. 8 is a view for illustrating the step in the FIG. 3 program of storing into the input mesh memory a level of a future represented in directional change.

Figure 9:
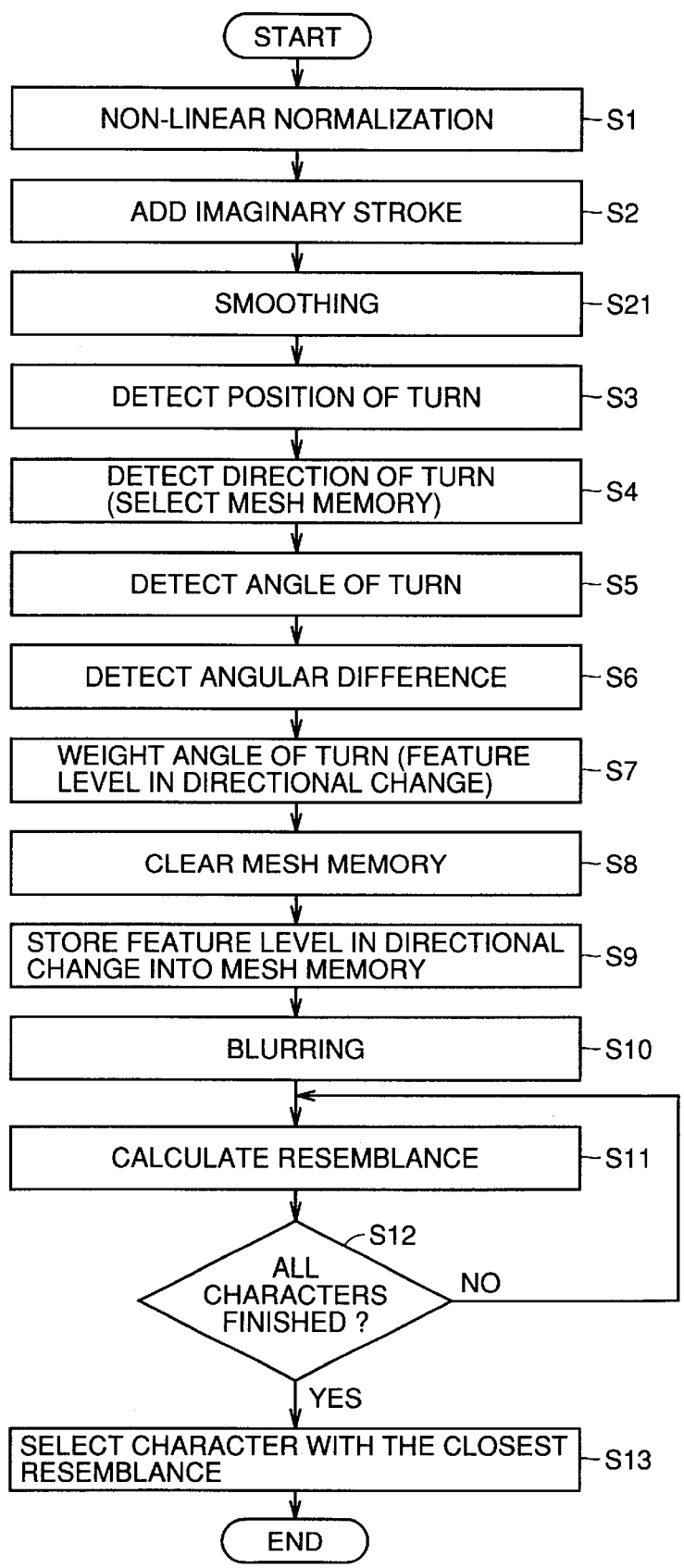

FIG. 9 is a flow chart representing a program for a handwritten character recognition system of a second embodiment of the present invention.

Figure 10A:
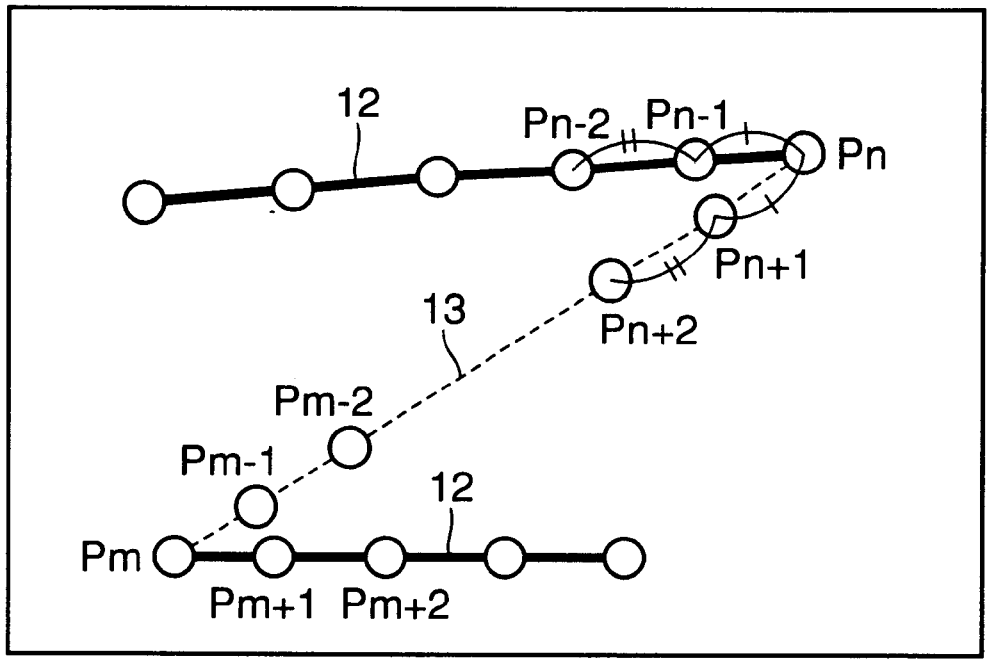
Figure 10B:
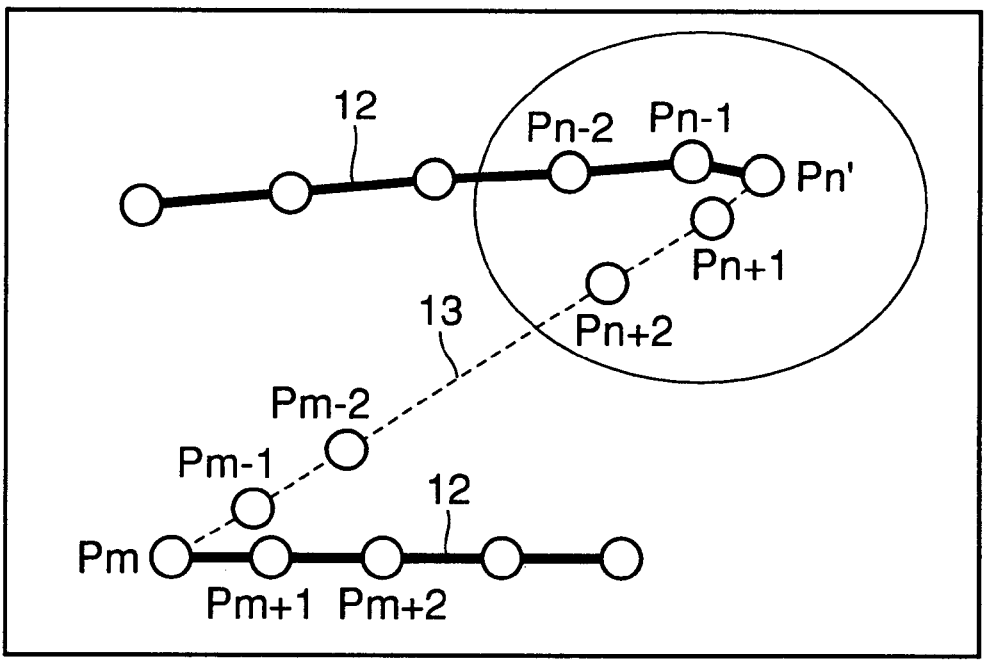

FIGS. 10A and 10B illustrate one example of the smoothing step shown in FIG. 9.

Figure 11:
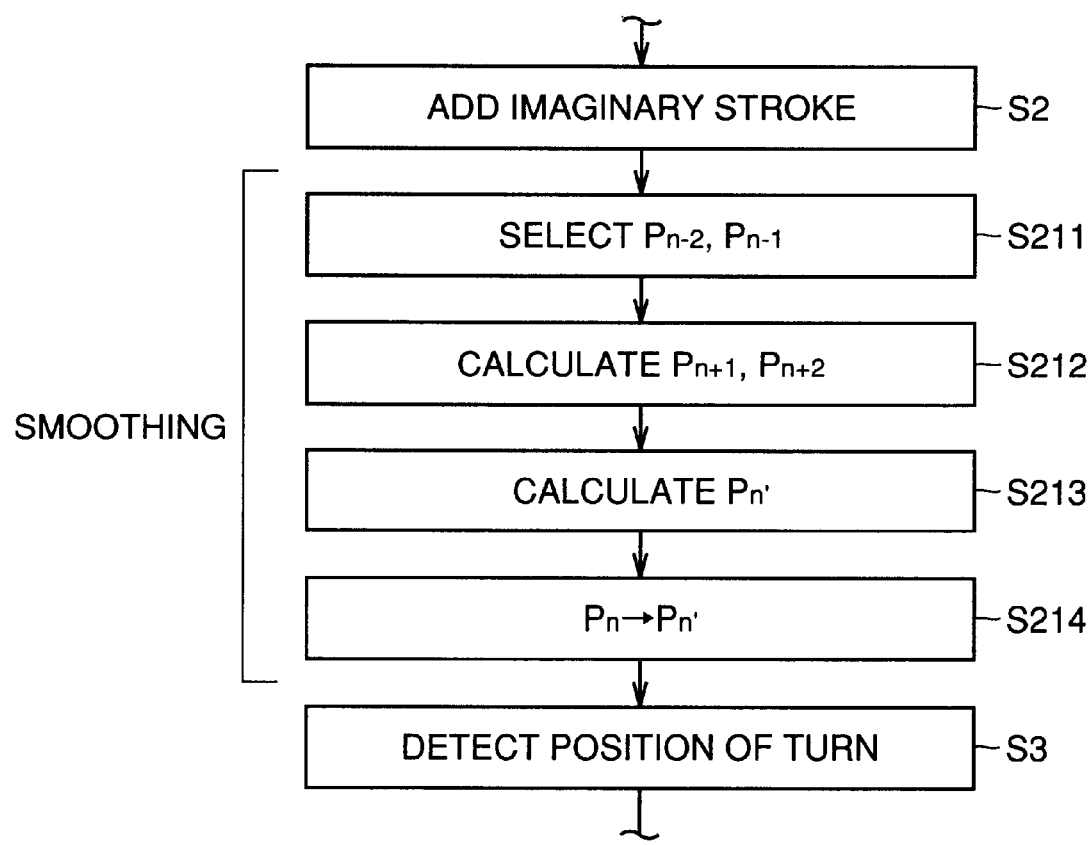

FIG. 11 is a flow chart representing a program for the smoothing represented in FIGS. 10A and 10B.

Figure 12C:
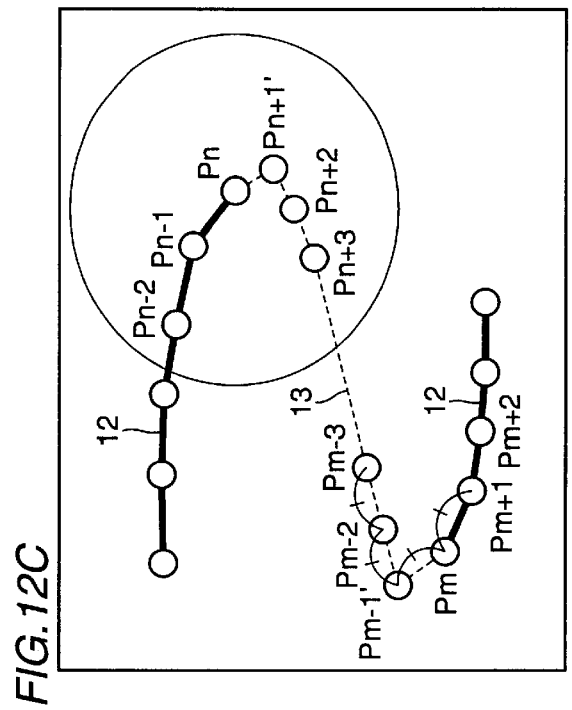
Figure 12A:
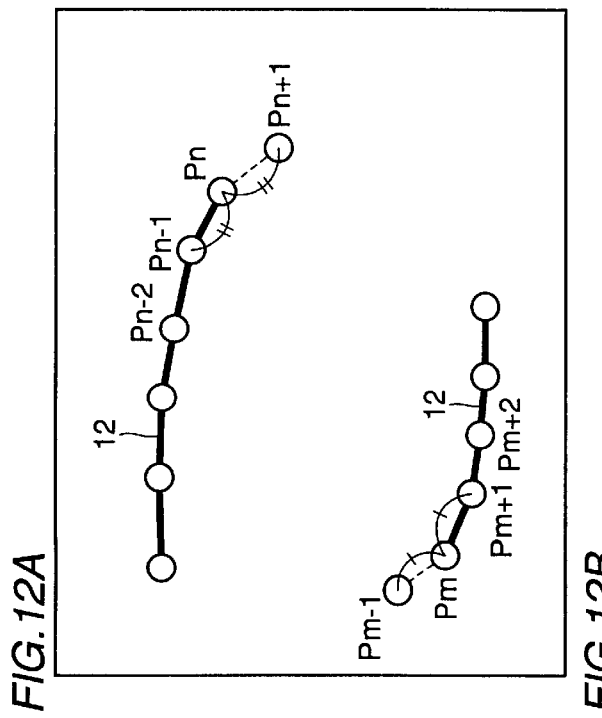
Figure 12B:
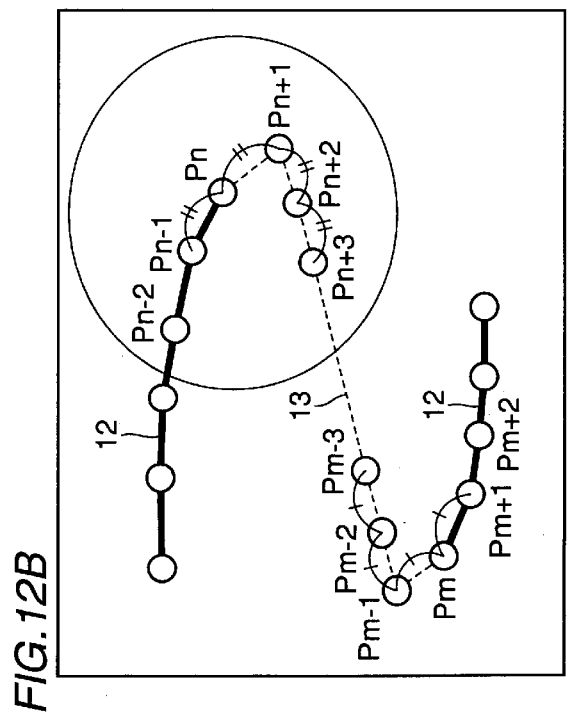

FIGS. 12A–12C illustrate another example of the smoothing step shown in FIG. 9.

Figure 13:
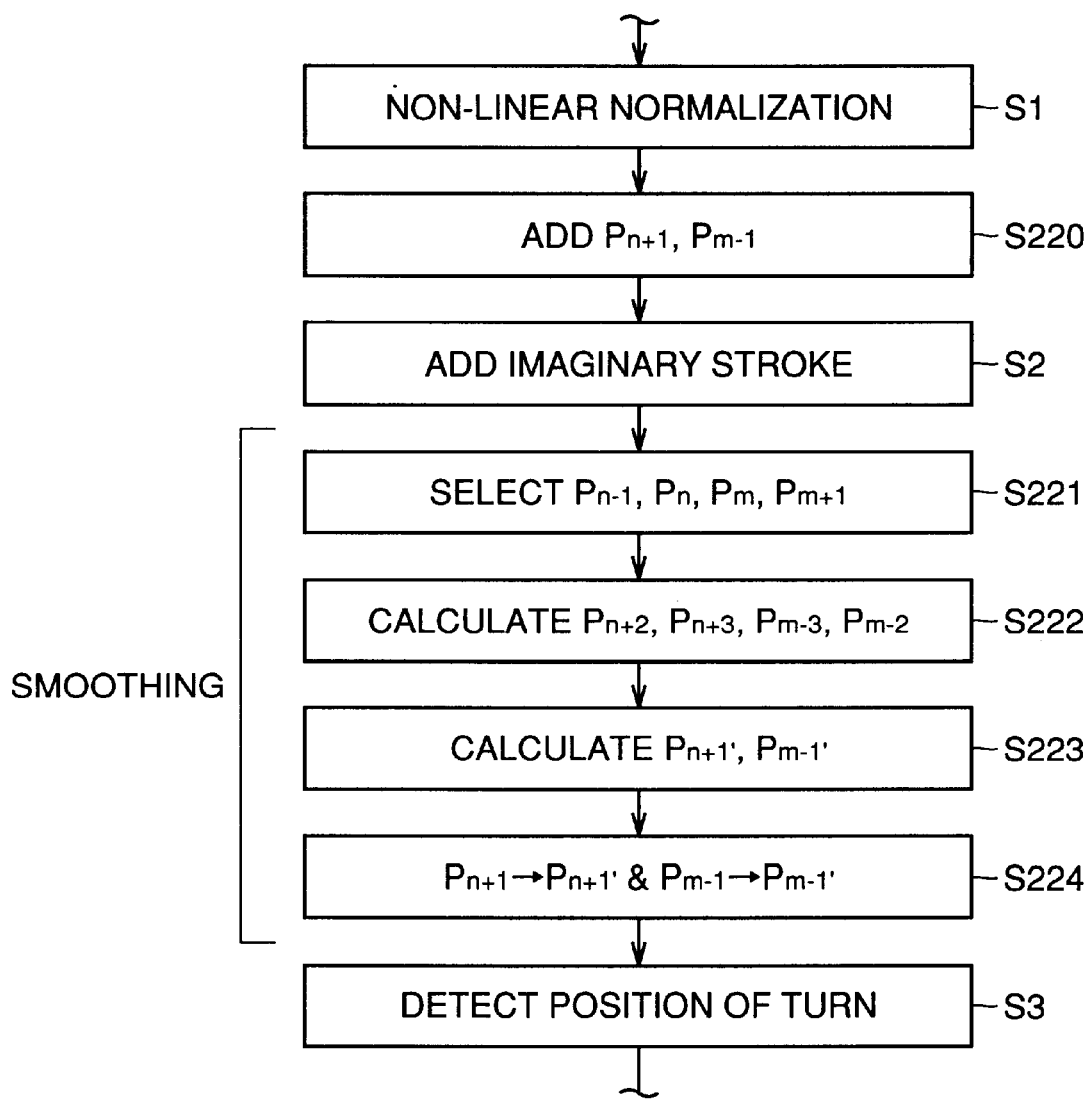

FIG. 13 is a flow chart representing a program for the smoothing shown in FIGS. 12A–12C.

Figure 14:
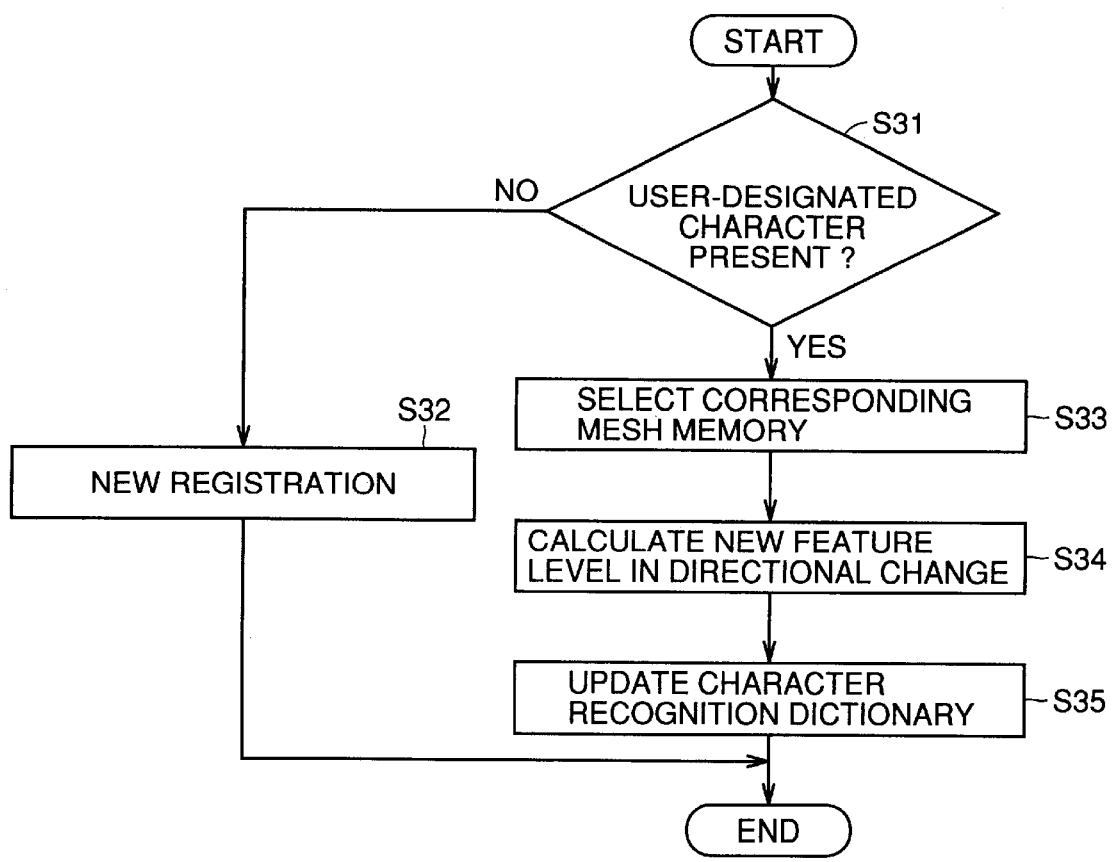

FIG. 14 is a flow chart representing a program for a handwritten character recognition system of a third embodiment of the present invention.

DESCRIPTION OF THE PREFERRED EMBODIMENTS

First Embodiment

Referring to FIG. 1, a handwritten character recognition system of a first embodiment includes a tablet 1 with display and input devices integrated therein, a main control unit 2, a character recognition unit 3, a dictionary memory 4, and a temporary memory 5.

Tablet 1 includes a liquid crystal display (LCD) device 1a and a two-dimensional digitizer 1b. Digitizer 1b detects a coordinate of a handwritten character input with a pen. LCD device 1a displays the handwritten character input to digitizer 1b, as appropriate. Each coordinate of LCD device 1a corresponds to a single coordinate of digitizer 1b. Thus the user can input a character to tablet 1 in such a manner that the user writes the character on a sheet of paper.

Main control unit 2 controls tablet 1, character recognition unit 3, dictionary memory 4 and temporary memory 5 according to a handwritten character recognition program stored in memory. Character recognition unit 3 compares coordinate data of an input handwritten character supplied from tablet 1 with the dictionary data stored in the dictionary memory to recognize the input handwritten character and supplies the recognized result to main control unit 2. Dictionary memory 4 stores a character recognition dictionary database formed by the method described hereinafter. Temporary memory 5 temporarily stores coordinate data of an input handwritten character supplied from main control unit 2.

Figure 2:
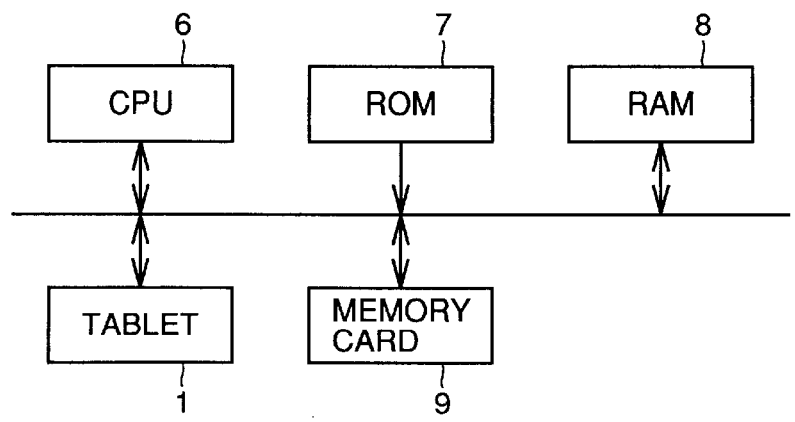
FIG. 2 is a functional block diagram showing the general configuration of a computer system configuring the FIG. 1 handwritten character recognition system.

Main control unit 2, character recognition unit 3, dictionary memory 4 and temporary memory 5 are configured by such a computer system as shown in FIG. 2. The computer system shown in FIG. 2 includes a central processing unit (CPU) 6, read only memory (ROM) 7, and random access memory (RAM) 8. A handwritten character recognition program is previously stored in ROM 7 or the program is stored in a mounted memory card 9 and thus read from memory card 9 to RAM 8. The character recognition dictionary database is also stored previously in ROM 7 or read from memory card 9 to RAM 8. CPU 6 performs character recognition process according to the handwritten character recognition program stored in ROM 7 or RAM 8. While memory card 9 is used herein as a storage medium storing the handwritten character recognition program, a CD-ROM, a floppy disc, a digital video disc (DVD) or the like may be alternatively used as the storage medium.

When a character is written on tablet 1 with a pen or the like, digitizer 1b detects coordinates of the handwritten character at predetermined time intervals (e.g., 1/100th second) and supplies time-series coordinate data of the handwritten character to main control unit 2. Main control unit 2 uses the supplied coordinate data to display the handwritten character on LCD device 1a and also transfers the coordinate data to character recognition unit 3. Character recognition unit 3 stores the supplied coordinate data into temporary memory 5, as appropriate. Main control unit 2 also determines using a timer (not shown) whether the pen has been lifted off tablet 1 for more than a predetermined period of time since detection of the initiation of a handwritten stroke of a character. When main control unit 2 determines that the pen has been lifted off for more than the predetermined period of time, main control unit 2 assumes that one character has been completely written and main control unit 2 issues to character recognition unit 3 a command to start character recognition.

In response to the command to start character recognition, character recognition unit 3 calculates the level of a feature of the handwritten character according to the coordinate data previously stored in temporary memory 5. The method of the feature level calculation will be detailed hereinafter. Character recognition unit 3 compares the calculated level of the feature with a level of the feature stored in dictionary memory 4 for each character to select a character in the character recognition dictionary that is the most resemblant to the handwritten character as a candidate of the character to be recognized and thus provide the recognized result to main control unit 2. In response to the recognized result, main control unit 2 erases a handwritten character that has been displayed on LCD device 1a and displays a new character in a block letter at the same position.

More specifically, such a hand written character recognition program as shown in FIG. 3 is stored in ROM 7 or RAM 8. CPU 6 provides character recognition process according to the handwritten character recognition program. The character recognition dictionary stored in dictionary memory 4 is formed such a method as represented in FIG. 4.

Figure 4:
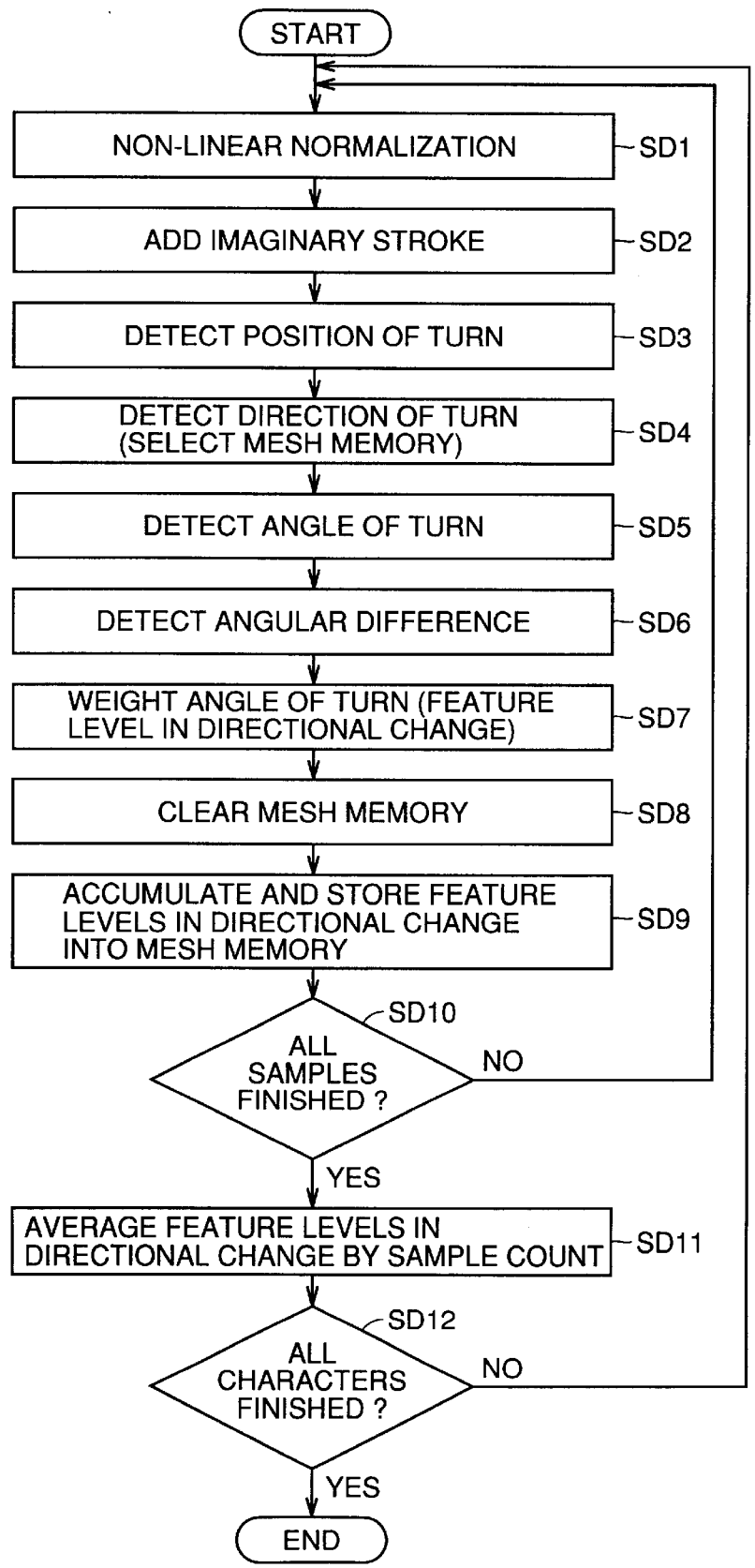
FIG. 4 is a flow chart of a method for forming a character recognition dictionary to be stored in the dictionary memory shown in FIG. 1.
Figure 5:
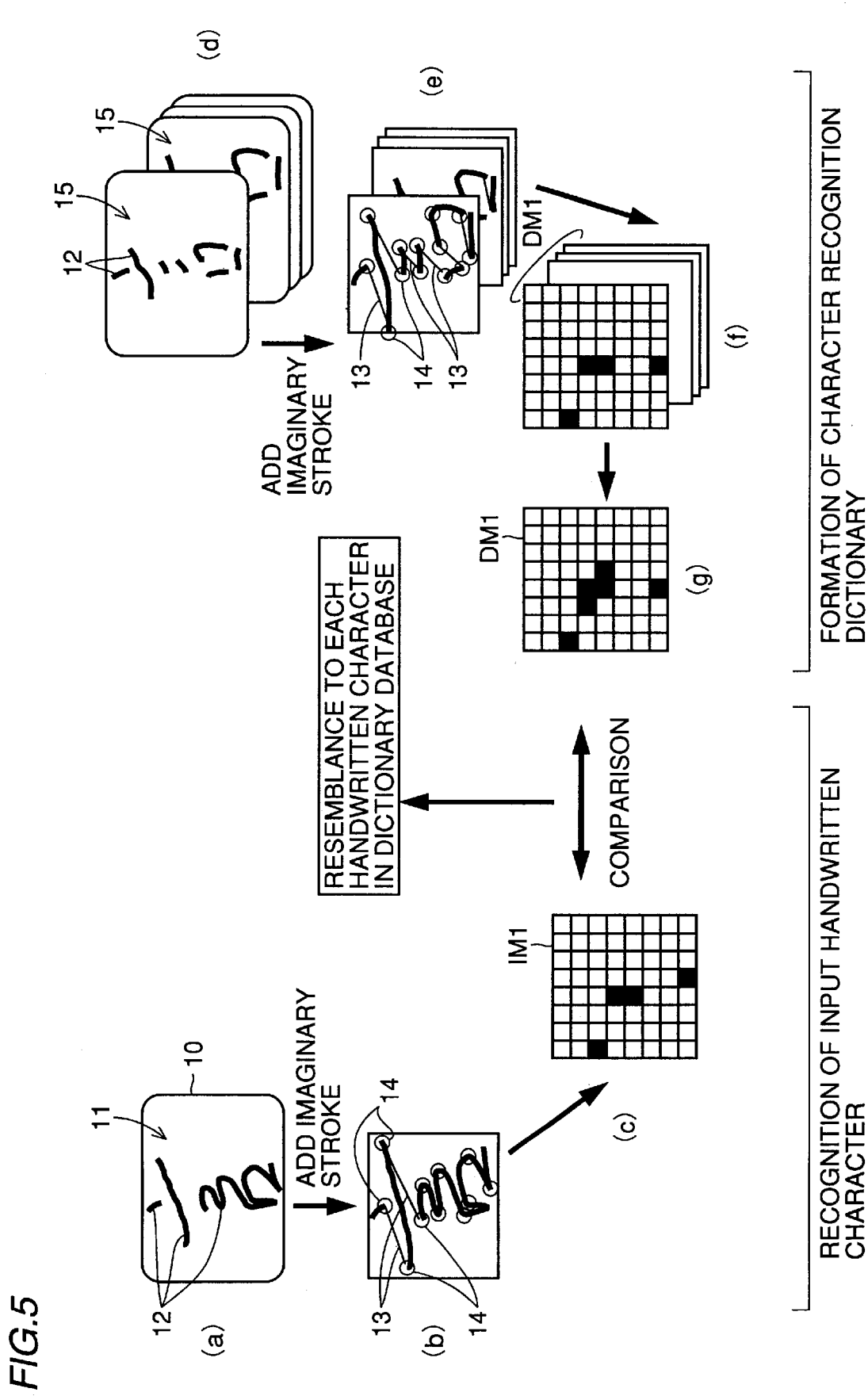

Reference will now be made to FIGS. 3–5 to describe a method of recognizing handwritten characters in accordance with the aforementioned handwritten character recognition system, and a method of forming a character recognition dictionary required therefor.

Initially at step S1 a handwritten character 11 input within a predetermined frame 10 is non-linearly normalized, as shown in FIG. 5(a). Such normalization allows a small character written within frame 10 to be enlarged to the full capacity of frame 10. The normalization provided non-linearly rather than linearly also allows input handwritten character 11 having a drawn line extremely longer than other lines of character 11 and thus resulting in a poor balance as a whole to be reformed into a well-balanced character. A method of non-linear normalization is disclosed, e.g., in "Handprinted Kanji OCR Development" IEICE TRANS. INF. & SYST, VOL. E79-D, NO. 5 MAY 1996, pp. 411–416, Hamanaka et. al. "On-Line Japanese Character Recognition Experiments by on Off-Line Method Based on Normalization-cooperated Feature Extraction" IEEE, 2nd ICDAR, Oct. 20–22, 1993, pp. 204–207. While non-linear normalization is herein used to normalize an input handwritten character, linear normalization can be alternatively used to normalize the character.

Then at step S2 the ending point of each actual stroke (a drawn line actually written) 12 of normalized handwritten character 11 and the starting point of the subsequent actual stroke 12 of character 11 are linked via an imaginary stroke 13, as shown in FIG. 5(b), to form a single line.

Then at steps S3–S9 is detected the level of a feature for specifying a turn in the cursive character. The feature more specifically includes the position of the turn (the coordinates of the turn), the direction of the turn (the direction in which a stroke extends after the turn), and the angle of the turn (the angle between the direction in which a stroke extends before the turn and the direction in which a stroke extends after the turn).

More specifically, initially at step S3 a turn position 14 is detected as shown in FIG. 5(b).

Then at step S4 a turn direction is detected. The turn direction is detected in such eight predetermined reference directions as shown in FIG. 6 (horizontally rightward, upper rightward, vertically upward, upper leftward, horizontally leftward, lower leftward, vertically downward and lower rightward directions). The direction of a turn to be detected herein is that in which a stroke extends after the turn, as shown in FIG. 7. An actual turn direction may match any of the eight reference directions shown in FIG. 6. However, most of actual turn directions do not match any of the eight reference directions and are located between any two of the reference directions. The turn direction is exemplified in FIG. 6 is located between the horizontally rightward direction and the upper rightward direction. Thus a turn direction is quantized in the eight reference directions according to the method described hereinafter.

As shown in FIG. 6, eight spatial, input-feature storage regions (also referred to as "input mesh memory" hereinafter) IM1 to IM8 are provided, corresponding to the eight reference directions. Spatial, input-feature storage regions IM1 to IM8 are provided in temporary memory 5 shown in FIG. 1 (RAM8 shown in FIG. 2). Input mesh memories IM1 to IM8 each have 8×8 squares. When the turn direction shown in FIG. 6 is detected, the two reference directions both immediately adjacent to the turn direction (i.e., the horizontally rightward direction and the upper rightward direction) are assumed to be the turn direction and input mesh memories IM1 and IM2 are selected accordingly.

Then at step S5 a turn angle D$\theta$ is detected. Turn angle DO is the angle between the direction in which a stroke extends after a turn and that in which a stroke extends after the turn, i.e., a turn direction, as shown in FIG. 7. It is a level of a feature represented in directional change for specifying the angle of a turn.

Then at step S6 is detected an angular difference a between the turn direction and the horizontally rightward reference direction and an angular difference $\beta$ between the turn direction and the upper rightward reference direction, as shown in FIG. 6. $\beta/(\alpha+\beta)$ represents the proximity of the horizontally rightward reference direction to the turn direction and $\alpha/(\alpha+\beta)$ represents the proximity of the upper rightward reference direction to the turn direction.

Then at step S7, turn angle (a level of a feature represented in directional change) D$\theta$ is weighted depending on angular differences $\alpha$ and $\beta$. More specifically, a weighting feature level f(x, y, 1) represented in directional change for the horizontally rightward reference direction and a weighting feature level f(x, y, 2) represented in directional change for the upper rightward reference direction are calculated according to the following equations (1) and (2), respectively:

$$f(x, y, 1) = \frac{\beta}{\alpha+\beta} \times D\theta \quad (1)$$

$$f(x, y, 2) = \frac{\alpha}{\alpha+\beta} \times D\theta \quad (2)$$

For $\alpha=18°$ and $\beta=27°$, for example, feature levels f(x, y, 1) and f(x, y, 2) are as follows:

$f(x, y, 1)=(3/5)D\theta$ $f(x, y, 2)=(2/5)D\theta$.

The above process is applied to all of turn positions detected in step S3.

Then at step S8, input mesh memories IM1 to IM8 are cleared to erase the data related to a handwritten character previously input.

Then at step S9, a feature level represented in directional change is stored in input mesh memories IM1 to IM8. An address at which the feature level is stored corresponds to a turn position detected in step S3. Thus the second turn position 14 in the input handwritten character shown in FIG. 5(b) corresponds to the square in the third row and the first column, as shown in FIG. 5(c), and the second turn position 14 has its feature level in directional change stored at the address of the square.

For the turn direction shown in FIG. 6, feature levels f(x, y, 1) and f(x, y, 2) represented in directional change that are calculated at step S7 are respectively stored in input mesh memories IM1 and IM2 selected at step S4. Thus, feature level f(x, y, 1) represented in directional change of each turn position is stored, for example, in input mesh memory IM1 at a square in FIG. 5(c) that is painted over in black.

In input mesh memories IM2 to IM8 other than input mesh memory IM1, a feature level in directional change is stored in a square shown in FIG. 8 that is painted over in black. In FIG. 8, shown under each of input mesh memories IM1 to IM8 is the reference direction corresponding thereto. It should be noted that the input handwritten character shown in dotted line on input mesh memories IM1 to IM8 is not stored as data.

For example, any feature level in directional change is not stored in input mesh memory IM4 corresponding to the upper leftward reference direction, since input handwritten character 11 with imaginary stroke 13 added thereto does not include stroke 12 or 13 that extends in the upper leftward direction after a turn. Input mesh memory IM2 does not store any feature level in directional change, either.

In input mesh memory IM3 corresponding to the vertically upward reference direction, the feature level in directional change of a point which turns vertically upward is stored at the address corresponding to the point. In other input mesh memories IM5 to IM8 also, feature levels in directional change of points turning in the associated reference directions are stored at the addresses corresponding to the points.

Thus a single input handwritten character 11 has the feature level in directional change at each turn position patterned on eight mesh memories IM1 to IM8. Reference will now be made to FIG. 4 to describe a method of forming a character recognition dictionary to be stored in dictionary memory 4 shown in FIG. 1.

The character recognition dictionary is formed basically in the same method as the aforementioned method of detecting a predetermined feature level from an handwritten character. More specifically, steps SD1–SD9 of FIG. 4 correspond to steps S1–S9 of FIG. 3, respectively.

Initially, as shown in FIG. 5(d), a plurality of persons write a same character to prepare a plurality of samples 15 of the handwritten character.

Then at step SD1 one of the samples 15 of the handwritten character is normalized non-linearly.

Then at step SD2 the ending point of each actual stroke 12 of the sample and the starting point of the subsequent actual stroke 12 of the sample are linked together via imaginary stroke 13 to form a single line, as shown in FIG. 5(e).

Then at step SD3 is detected turn position 14 of handwritten character sample 15 with imaginary stroke 13 added thereto.

Then at steps SD4–SD9 the feature level in directional change at each detected turn position is detected and stored in the dictionary mesh memory at the address corresponding to the detected turn position. For example, in dictionary mesh memory DM1 corresponding to the right reference direction, a feature level in directional change is stored in the manner shown in FIG. 5(f).

Then at step SD10 it is determined whether the process of steps SD1–SD9 is completed for all samples. If not, the process of steps SD1–SD9 is applied to the subsequent sample 15 of the handwritten character. If the process is completed, a plurality of dictionary mesh memories DM1s will complete in which the feature levels in directional change of a plurality of samples 15 of a handwritten character are stored at the addresses corresponding to the turn positions in the samples, as shown in FIG. 5(f).

Then at step SD11 the feature levels in directional change in the plurality of dictionary mesh memories DM1s that are located in a same square are summed up and divided by the number of the samples 15 of the handwritten character to calculate the average of the feature levels in directional change. Thus a single dictionary mesh memory DM1 is obtained, as shown, e.g., in FIG. 5(g).

The process of steps SD1 to SD11 is applied to all characters to be recognized. That is, at step SD12 it is determined whether the above process has been applied to all characters. If not, the subsequent character is subjected to the process. When the process has been applied to all characters, the forming of the character recognition dictionary will complete.

Referring again to FIG. 3, a turn position detected at step S3 is blurred at step S10 provided after step S9. More specifically, each feature level in directional change that is stored in a square of input mesh memories IM1 to IM8 is dispersed to squares around the square. More specifically, the square associated with a turn position detected stores a maximal feature level in directional change. The eight squares therearound store a smaller feature level than the maximal feature level in directional change. The 16 squares therearound store a still smaller feature level than the smaller feature level in directional change. Thus a square more distant from that associated with a detected turn position stores a smaller feature level in directional change.

Then, at step S11, input mesh memories IM1 to IM8 obtained through the process of steps S1 to S10 are compared with the dictionary mesh memory previously formed by the method represented in FIG. 4. For example, a feature level in directional change that is mapped on input mesh memory IM1 is compared with that in directional change that is mapped on associated dictionary mesh memory DM1. Other input mesh memories IM2 to IM8 are similarly compared with their respectively associated dictionary mesh memories. Thus the resemblance of input handwritten character 11 to a handwritten character in the dictionary database is calculated. Resemblance rfc is calculated according to the following equation:

$$rfc = \frac{\sqrt{\sum_{v=1}^{8} \sum_{x,y=1}^{8} f(x, y, v) \times f_c(x, y, v)}}{\sqrt{\sum_{v=1}^{8} \sum_{x,y=1}^{8} f(x, y, v)^2} \times \sqrt{\sum_{v=1}^{8} \sum_{x,y=1}^{8} f_c(x, y, v)^2}} \quad (3)$$

wherein f(x, y, v) represents a feature level in directional change that is stored in a square of an input mesh memory IMv and fc (x, y, v) represents a feature level in directional change that is stored in a square of a dictionary mesh memory DMv. In the above example, x=1 to 8, y=1 to 8, v=1 to 8.

The resemblance is calculated with respect to all handwritten characters in the character recognition dictionary. If in step S12 the calculation of the resemblance has not yet been completed for all handwritten characters in the dictionary database, again in step 11 the resemblance is calculated for the subsequent handwritten character in the dictionary database.

When the calculation of the resemblance is completed with respect to all handwritten characters in the dictionary database, at step S13 a handwritten character in the dictionary database that has the closest, calculated resemblance is selected and recognized as the input handwritten character.

The user determines whether the recognized result is correct. If not, the user checks successively from the handwritten character in the dictionary database that has the second closest resemblance onward and the user thus designates among the checked characters the character input by the user.

Thus, in the present embodiment, imaginary strokes 13 is initially added to input handwritten character 11 and a feature level is then detected for specifying a turn. Thus cursive characters can also be recognized correctly. Detection of turn position 14 of a character also prevents recognition rate from significantly dropping if the stroke order of the character is incorrect. The comparison of a feature level in directional change of input handwritten character 11 to that in the directional change of handwritten character 15 in the dictionary database also allows further increased recognition rate.

Furthermore the quantization of a turn direction in eight reference directions can reduce the amount of information to be processed and increase processing speed.

Furthermore, a feature level in directional change that is dispersed therearound to blur a turn position allows correct recognition of input handwritten character 11 that is unique and thus has turn position 14 slightly offset from turn position 14 of handwritten character 15 in the dictionary database.

Furthermore, handwritten character samples actually written by a plurality of persons used to form a character recognition dictionary allow correct recognition of handwritten characters written by a large number of unspecified users with peculiar writing ways of their own.

It should be noted that while in the present embodiment two reference directions adjacent to a turn direction are regarded as the turn direction and two input mesh memories associated with the two reference directions each store a feature level in directional change, alternatively the reference direction closest to a turn direction may be regarded as the turn direction and only the input mesh memory associated with the reference direction may store a feature level in directional change. In this example, the amount of information to be processed can be reduced and processing speed can be increased.

It should also be noted that while in the present embodiment the feature level in directional change at a turn position of actual stroke 12 and that in directional change at a turn position between actual stroke 12 and imaginary stroke 13 are not discriminated from each other in processing them, the feature level in directional change at the turn position between actual and imaginary strokes 12 and 13 may be weighted lighter than that in directional change at the turn position on actual stroke 12. It should be noted, however, that to increase recognition rate for characters with more stroke counts the feature level in directional change at a turn position between actual and imaginary strokes 12 and 13 may be weighted heavier than that in directional change at a turn position on actual stroke 12. Furthermore the longer imaginary stroke 13 is, the more lightly weighted feature level in directional change its starting and ending points may each have at their respective turn positions so as to increase recognition rate on the assumption that when a stroke has its starting point closer in distance to the preceding stroke's ending point the two strokes are written more cursively.

Second Embodiment

In the first embodiment, the ending point of an actual stroke and the starting point of the subsequent actual stroke are linked together simply with a line. Thus a character written with each stroke linked to the next stroke in the cursive style and a character written with each stroke not linked to the next stroke in the block style are often different in the pattern of a feature level detected at a portion linking an actual stroke and an imaginary stroke together. This can reduce recognition rate. More specifically, a cursive character is dissimilar to a character with imaginary strokes added thereto, often having a smooth, curved line rather than an acute angle at a stroke-linking portion.

Accordingly in the second embodiment the smoothing step S21 is added after the imaginary-stroke adding step S2 and before the turn-position detecting step S3, as shown in FIG. 9. In step S21, a portion linking an actual stroke and an imaginary stroke together is smoothed to provide a smooth, curved line. Among various smoothing techniques, two smoothing techniques will now be described.

According to a first smoothing technique, an ending point $P_n$ of actual stroke 12 is repositioned to smooth a turn between strokes 12 and 13, as shown in FIGS. 10A and 10B. Although it is not shown, a starting point $P_m$ of actual stroke 12 is also repositioned to smooth a turn between strokes 12 and 13. In FIG. 10A on actual strokes 12 are shown coordinate points $P_{n-2}$, $P_{n-1}$, $P_{m+1}$, $P_{m+2}$ selected from a large number of coordinate points previously detected by digitizer 1b at predetermined time intervals. Coordinate points $P_{n-2}$, $P_{n-1}$, $P_{m+1}$, $P_{m+2}$ are each detected previously at a predetermined time interval longer than the above predetermined intervals. More specifically, in the first smoothing technique a distance $|P_n-P_{n-1}|$ from actual stroke 12 starting point $P_n$ to point $P_{n-1}$ and a distance $|P_{n-1}-P_{n-2}|$ from points $P_{n-1}$ to $P_{n-2}$ are calculated and used to position point $P_{n+1}$ on imaginary stroke 13 distant from its starting point $P_n$ by the distance $|P_n-P_{n-1}|$ and point $P_{n+2}$ on imaginary stroke 13 distant from point $P_{n+1}$ by the distance $|P_{n-1}-P_{n-2}|$ to reposition ending point $P_n$.

The first smoothing technique will now be detailed with reference to FIG. 11.

At step S2, imaginary stroke 13 is added. Then at step S211 two points $P_{n-2}$, $P_{n-1}$ are selected on actual stroke 12. More specifically, the distance $|P_n-P_{n-1}|$ from actual stroke 12 ending point $P_n$ to point $P_{n-1}$ is calculated and so is the distance $|P_{n-1}-P_{n-2}|$ from points $P_{n-1}$ to $P_{n-2}$.

Then at step S212 two points $P_{n+1}$, $P_{n+2}$ are calculated on imaginary stroke 13. More specifically, point $P_{n+1}$ is set at the point distant from actual stroke 12 ending point $P_n$ by the distance $|P_n-P_{n-1}|$ and point $P_{n+2}$ is set at the point distant from point $P_{n+1}$ by the distance $|P_{n-1}-P_{n-2}|$.

Then at step S213 is calculated a new ending point $P_n'$ to be substituted for ending point $P_n$. More specifically, the coordinates of new ending point $P_n'$ are calculated according to the following equations:

$$P_n'(x)=\{P_{n-2}(x)+2P_{n-1}(x)+4P_n(x)+2P_{n+1}(x)+P_{n+2}(x)\}/10 \quad (4)$$

$$P_n(y)=\{P_{n-2}(y)+2P_{n-1}(y)+4P_n(y)+2P_{n+1}(y)+P_{n+2}(y)\}/10 \quad (5)$$

wherein P(x) is the x-coordinate of P and P(y) is the y-coordinate of P.

Then, at step S2 14, ending point $P_n$ is substituted by calculated, new ending point $P_n'$.

Actual stroke 12 starting point $P_m$ is smoothed similarly. More specifically, two points $P_{m+1}$, $P_{m+2}$ are selected on actual stroke 12 and two points $P_{m-1}$, $P_{m-2}$ are calculated on imaginary stroke 13. Point $P_{m-1}$ is set at the point distant from starting point $P_m$ by a distance $|P_{m+1}-P_m|$ and point $P_{m-2}$ is set at the point distant from point $P_{m-1}$ by a distance $|P_{m+2}+P_{m+1}|$.

Then similarly a new starting point $P_m'$ to substitute for starting point $P_m$ is calculated and starting point $P_m$ is substituted by the calculated, new starting point $P_m'$.

The smoothing process described above is applied to all of points linking actual and imaginary strokes 12 and 13 together.

Thereafter, the same process as steps S3 to S13 of the first embodiment is applied to recognize an input handwritten character. It should be noted, however, that if smoothing is applied as described above, it is also necessary to apply the smoothing in forming the character recognition dictionary database.

While in FIG. 10A two points $P_{n-1}$, $P_{n-2}$ can be set before actual stroke 12 ending point $P_n$, a short actual stroke 12 may be allowed to set only one point before its ending point. In such a case, point $P_{n+1}$ is only calculated on imaginary stroke 13 and new point $P_n'$ to be substituted for ending point $P_n$ is calculated according to the following equations:

$$P_n'(x)=\{2P_{n-1}(x)+4P_n(x)+2P+1(x)\}/8 \quad (6)$$

$$P_n'(y)=\{2P_{n-1}(y)+4P_n(y)+2P_{n+1}(y)\}/8 \quad (7)$$

While the technique selects points $P_{n-1}$, $P_{n-2}$ detected previously at predetermined time intervals, a new point $P_{n-1}$ distant from ending point $P_n$ by a predetermined distance D and a new point $P_{n-2}$ distant from point $P_{n-1}$ by the predetermined distance D may be alternately detected and used to similarly calculate points $P_{n+1}$, $P_{n+2}$.

In a second smoothing technique, actual stroke 12 is extended to add an imaginary ending point $P_{n+1}$ and an imaginary starting point $P_{m-1}$, as shown in FIG. 12A, imaginary stroke 13 is then added, as shown in FIG. 12B, and smoothing is then applied, as shown in FIG. 12C, in the same manner as described above. The second smoothing technique provides higher recognition rate than the first smoothing technique.

The second smoothing technique will be detailed with reference to FIG. 13.

Actual stroke 12 is extended to add imaginary ending point $P_{n+1}$ and imaginary starting point $P_{n-1}$, as shown in FIG. 12A, in step S220, i.e., after step S1 non-linearly normalizing an input handwritten character and before step S2 adding an imaginary stroke. A distance $|P_{n+1}-P_n|$ between imaginary ending point $P_{n+1}$ and ending point $P_n$ is equal to a distance $|P_n-P_{n-1}|$ between ending point $P_n$ and point $P_{n-1}$, the point on actual stroke 12 that is located immediately before ending point $P_n$. Furthermore, the angle of the directional change at ending point $P_n$ is equal to that of the directional change at point $P_{n-1}$. In other words, new ending point $P_{n+1}$ is set by extending actual stroke 12 while providing to actual stroke 12 a curve similar to that around ending point $P_n$.

Actual stroke 12 is further extended to add imaginary starting point $P_{n-1}$. A distance $|P_{m-1}-P_m|$ between imaginary starting point $P_{m-1}$ and starting point $P_m$ is equal to a distance $|P_m-P_{m+1}|$ between starting point $P_m$ and the subsequent point $P_{m+1}$ on actual stroke 12. The angle of the directional change at starting point $P_m$ is equal to that of the directional change at point $P_{m+1}$. In other words, new starting point $P_{m-1}$ is set by extending actual stroke 12 while providing to actual stroke 12 a curve similar to that around starting point $P_m$.

Then, at step S2, imaginary stroke 13 is added, as shown in FIG. 12B.

Then, at steps 221 to S224, smoothing is applied in the same manner as steps S211 to S214.

More specifically, at step S221, previously detected points $P_{n-1}$, $P_n$, $P_m$, $P_{m+1}$ are selected.

Then, at step S222, point $P_{n+2}$ is calculated on imaginary stroke 13 distant from imaginary ending point $P_{n+1}$ by the distance $|P_{n+1}-P_n|$ and point $P_{n+3}$ is also calculated on imaginary stroke 13 distant from point $P_{n+2}$ by the distance $|P_n-P_{n-1}|$. Furthermore, point $P_{m-2}$ is calculated on imaginary stroke 13 distant from imaginary starting point $P_{m-1}$ by the distance $|P_m-P_{m-1}|$ and point $P_{m-3}$ is calculated on imaginary stroke 13 distant from point $P_{m-2}$ by the distance $|P_{m+1}-P_m|$.

Then, at step S223, as is similar in calculating the coordinates of new point $P_n'$ according to expressions (4) and (5), the coordinates of a new imaginary ending point $P_{n+1}'$ to be substituted for imaginary ending point $P_{n+1}$ is calculated and so is those of an imaginary starting point $P_{m-1}'$ to be substituted for imaginary starting point $P_{m-1}$.

Then, at step S224, imaginary ending and starting points $P_{n+1}$ and $P_{m-1}$ are substituted with the calculated, new imaginary ending and starting points $P_{n+1}'$ and $P_{m-1}'$, respectively, as shown in FIG. 12C.

If an input handwritten character is to be smoothed as described above, handwritten characters in the dictionary database are also similarly smoothed to provide a character recognition dictionary database.

While the second smoothing technique extends actual stroke 12 and sets a single imaginary ending or starting point, a plurality of imaginary ending or starting points may be alternatively set before smoothing is applied. In this example, the coordinates of the imaginary starting or ending points can be calculated as described above. More specifically, a single imaginary ending or starting point can be set based on the distance between the point preceding and closest to the single imaginary point and the point preceding and second closest to the single imaginary point and on the angle of the directional change at the point immediately preceding the point preceding and third closest to the single imaginary point.

Since in the second embodiment an imaginary stroke is added to a handwritten character and the handwritten character with the imaginary stroke is then smoothed, a portion of the character that links actual and imaginary strokes together is close in shape to the character actually written cursively, resulting in still higher recognition rate.

Third Embodiment

In the above embodiments, a character recognition dictionary is previously formed and thereafter its content is not changed. Thus, recognition rate may drop if an actual user writes a character which is significantly different from handwritten character samples.

The third embodiment relates to a character recognition system provided with a learning function which uses a feature level of an input handwritten character to update that of a handwritten character in the dictionary database.

More specifically, the third embodiment provides such a process as shown in FIG. 14 after step S13 If a character with the closest resemblance is a character actually input by the user, the user designates the character with the closest resemblance. If not, the user designates the character actually input by the user among characters with less close resemblances. If the input character is not found in the handwritten character dictionary database, the user registers the character therein.

At step S31 it is determined whether the character designated by the user is present in the character recognition dictionary database.

If not, at step S32 a feature level in directional change based on the input handwritten character that is stored in an input mesh memory is stored in a dictionary mesh memory. Thus a new handwritten character is registered in the character recognition dictionary database.

If the character designated by the user is present in the character recognition dictionary database, the eight dictionary mesh memories associated with the designated character are selected at step S33.

Then, at step S34, the feature level in directional change that is stored in the input mesh memory is used to calculate a new feature level in directional change that is to be stored in a selected dictionary mesh memory. When f(x, y, v) represents the feature level in directional change that is stored in the input mesh memory and fc(x, y, v) represents the feature level in directional change that is stored in the dictionary mesh memory, a new feature level fc'(x, y, v) in directional change to be stored in the dictionary mesh memory is calculated according to the following equation:

$$fc'(x, y, v) = \frac{fc(x, y, v) + w \times f(x, y, v)}{1 + w} \quad (8)$$

wherein w represents a weighting coefficient larger than zero and smaller than one. With weighting coefficient w closer to zero, a feature level in directional change of an input handwritten character less affects on that in directional change of a handwritten character in the dictionary database. As weighting coefficient w approaches one, a feature level in directional change of an input handwritten character increasingly affects that in directional change of a handwritten character in the dictionary database.

Then, at step S35, the calculated, new feature level fc'(x, y, v) in directional change substitutes for feature level fc(x, y, v) in directional change of a handwritten character in the dictionary database and thus stored in a dictionary mesh memory to update the character recognition dictionary database.

Thus in the third embodiment an input handwritten character can be used to update the character recognition dictionary database so that the character actually handwritten by the user is learned and recognition rate is thus further increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of recognizing an input handwritten character, comprising the steps of:

linking from an ending point of each actual stroke of said input handwritten character to a starting point of an actual stroke subsequent to said each actual stroke with an imaginary stroke to form a line;

detecting a feature level for specifying a turn of said line;

comparing said detected feature level with each feature level of a plurality of handwritten characters in a previously formed dictionary database to calculate a resemblance of said input handwritten character to each said handwritten character in said dictionary database; and determining as said input handwritten character a handwritten character in said dictionary database having said calculated resemblance closest to said input handwritten character.

2. The method of claim 1, wherein said feature level includes a position of said turn.

3. The method of claim 2, wherein said feature level includes at least one of a direction of said turn and an angle of said turn.

4. The method of claim 3, wherein said step of detecting includes the step of identifying said direction of said turn depending on a plurality of predetermined reference directions.

5. The method of claim 4, wherein said step of identifying includes the step of assuming as said direction of said turn one of said plurality of reference directions closest to said direction of said turn.

6. The method of claim 4, wherein said step of identifying includes the step of assuming as said direction of said turn both two of said plurality of reference directions immediately adjacent to said direction of said turn.

7. The method of claim 6, wherein said step of identifying further includes the step of weighting said angle of said turn depending on a proximity of each of said both two reference directions to said direction of said turn.

8. The method of claim 2, further comprising the step of blurring said detected position of said turn after said step of detecting and before said step of comparing.

9. The method of claim 8, wherein said step of blurring includes the step of providing a highest score to the said detected position of said turn and a lower score to a position more distant from said detected position of said turn.

10. The method of claim 1, wherein each feature level of said handwritten characters in said dictionary database is calculated by averaging feature levels of a plurality of handwritten character samples by the number of said samples.

11. The method of claim 1, further comprising the step of using said detected feature level of said input handwritten character to update a feature level of said determined handwritten character in said dictionary database.

12. The method of claim 1, wherein said step of comparing compares said detected feature level with each feature level of said handwritten characters in said dictionary database without discriminating between said feature level for specifying said turn of said actual stroke and a feature level for specifying a turn between said actual stroke and said imaginary stroke.

13. The method of claim 1, wherein said step of comparing compares said detected feature level with each feature level of said handwritten characters in said dictionary database after weighting said feature level for specifying said turn of said actual stroke with a first coefficient and weighting a feature level for specifying a turn between said actual stroke and said imaginary stroke with a second coefficient differing from said first coefficient.

14. The method of claim 13, wherein said second coefficient is smaller than said first coefficient.

15. The method of claim 1, wherein said step of comparing compares said detected feature level with each feature level of said handwritten characters in said dictionary database after weighting a feature level for specifying a turn between said actual stroke and said imaginary stroke having a first length with a fast coefficient and weighting a feature level for specifying a turn between said actual stroke and said imaginary stroke having a second length longer than said first length with a second coefficient smaller than said first coefficient.

16. The method of claim 1, further comprising the step of smoothing a portion linking said actual stroke and said imaginary stroke together.

17. The method of claim 16, wherein the step of smoothing repositions a starting point and/or an ending point of said actual stroke at a position closer to said actual stroke and an imaginary stroke linked to said actual stroke starting point or ending point.

18. The method of claim 17, wherein said step of smoothing includes the steps of:

selecting a point on said actual stroke detected earlier and/or later than said actual stroke starting point and/or ending point by a predetermined period of time to calculate a distance from said actual stroke starting point and/or ending point to said point selected on said actual stroke;

detecting a point on said imaginary stroke distant by said calculated distance from said imaginary stroke ending point and/or starting point linked to said actual stroke starting point and/or ending point; and using said point selected on said actual stroke and said point detected on said imaginary stroke to determine said closer position.

19. The method of claim 17, said step of smoothing determines said closer position depending on a position of a point on said actual stroke distant from said actual stroke starting point and/or ending point by a predetermined distance and a point on said imaginary stroke distant by said predetermined distance from said imaginary stroke ending point and/or starting point linked to said actual stroke starting point or ending point.

20. The method of claim 16, further comprising the step of extending said actual stroke and adding an imaginary starting point and an imaginary ending point, wherein:

said step of linking links from said imaginary ending point of each actual stroke of said input handwritten character to said imaginary starting point of an actual stroke subsequent to said each actual stroke of said input handwritten character with imaginary stroke to form said line; and said step of smoothing repositions said imaginary starting point and said imaginary ending point at a position closer to said actual stroke and an imaginary stroke linked to said imaginary starting point or imaginary ending point of said actual stroke.

21. A system for recognizing an input handwritten character, comprising:

a linking device constituted to link from an ending point of each actual stroke of said input handwritten character to a starting point of an actual stroke subsequent to said each actual stroke with an imaginary stroke to form a line;

a detecting device constituted to detect a feature level for specifying a turn of said line formed by said linking device;

a dictionary memory storing feature levels of a plurality of handwritten characters of a previously formed dictionary database;

a comparing device constituted to compare a feature level detected by said detecting device with each feature level of said plurality of handwritten characters of said dictionary database in said dictionary memory to calculate a resemblance of said input handwritten character to each said handwritten character in said dictionary database; and a determining device constituted to determine as said input handwritten character a handwritten character in said dictionary database having the closest resemblance calculated by said comparing device.

22. The system of claim 21, wherein said feature level includes a position of said turn.

23. The system of claim 22, wherein said feature level includes at least one of a direction of said turn and an angle of said turn.

24. The system of claim 23, further comprising a temporary memory including a plurality of spatial, input-feature storage regions associated with to a plurality of predetermined reference directions, for storing a feature level in directional change for specifying said angle of said turn, wherein:

said dictionary memory includes a plurality of spatial, dictionary database feature storage regions associated with said plurality of reference directions, for storing a feature level in directional change for specifying said angle of said turn of said handwritten character in said dictionary database;

said detecting device stores said feature level in directional change into said temporary memory at an address corresponding to said position of said turn detected; and said comparing device compares each of said spatial, input-feature storage regions in said temporary memory with an associated one of said spatial, dictionary database feature storage regions in said dictionary memory.

25. The system of claim 24, wherein said detecting device assumes as said direction of said turn one of said plurality of reference directions closest to said direction of said turn.

26. The system of claim 24, wherein said detecting device assumes as said direction of said turn both two of said plurality of reference directions immediately adjacent to said direction of said turn.

27. The system of claim 26, wherein said detecting device uses a proximity of each of said both two reference directions to said direction of said turn to weight said feature level in directional change and said detecting device stores the weighted said feature level in directional change into spatial, input-feature storage regions respectively associated with said both two reference directions.

28. The system of claim 22, further comprising a blurring device constituted to blur said position of said turn detected by said detecting device, before providing said position of said turn to said comparing device.

29. The system of claim 28, wherein said blurring device provides a highest score to said position of said turn detected by said detecting device and a lower score to a position more distant from said position of said turn detected by said detecting device.

30. The system of claim 21, wherein each feature level of said handwritten characters of said dictionary database in said dictionary memory is calculated by averaging feature levels of a plurality of handwritten character samples by the number of said samples.

31. The system of claim 21, further comprising an updating device constituted to update said feature level of said handwritten character in said dictionary database determined by said determining device, using said feature level of said input handwritten character detected by said detecting device.

32. The system of claim 31, wherein said comparing device compares said detected feature level with each feature level of said handwritten characters in said dictionary database without discriminating between said feature level for specifying said turn of said actual stroke and a feature level for specifying a turn between said actual stroke and said imaginary stroke.

33. The system of claim 31, wherein said comparing device compares said detected feature level with each feature level of said handwritten characters in said dictionary database after weighting said feature level for specifying said turn of said actual stroke with a first coefficient and weighting a feature level for specifying a turn between said actual stroke and said imaginary stroke with a second coefficient differing from said first coefficient.

34. The system of claim 33, wherein said second coefficient is smaller than said first coefficient.

35. The system of claim 31, wherein said comparing device compares said detected feature level with each feature level of said handwritten characters in said dictionary database after weighting a feature level for specifying a turn between said actual stroke and said imaginary stroke having a first length with a first coefficient and weighting a feature level for specifying a turn between said actual stroke and said imaginary stroke having a second length longer than said first length with a second coefficient smaller than said first coefficient.

36. The system of claim 21, further comprising a smoothing device constituted to smooth a portion linking said actual stroke and said imaginary stroke together.

37. The system of claim 36, wherein said smoothing device repositions a starting point and/or an ending point of said actual stroke at a position closer to said actual stroke and an imaginary stroke linked to said actual stroke starting point or ending point.

38. The system of claim 37, wherein said smoothing device includes:
   means for selecting a point on said actual stroke detected earlier and/or later than said actual stroke starting point and/or ending point by a predetermined period of time to calculate a distance from said actual stroke starting point and/or ending point to said point selected on said actual stroke;
   means for detecting a point on said imaginary stroke distant by said calculated distance from said imaginary stroke ending point and/or starting point linked to said actual stroke starting point and/or ending point; and
   mean for using said point selected on said actual stroke and said point detected on said imaginary stroke to determine said closer position.

39. The system of claim 37, said smoothing device determines said closer position depending on a position of a point on said actual stroke distant from said actual stroke starting point and/or ending point by a predetermined distance and a point on said imaginary stroke distant by said predetermined distance from said imaginary stroke ending point and/or starting point linked to said actual stroke starting point or ending point.

40. The system of claim 36, further comprising an extending device constituted to extend said actual stroke and add an imaginary starting point and an imaginary ending point, wherein:
   said linking device links from said imaginary ending point of each actual stroke of said input handwritten character to said imaginary starting point of an actual stroke subsequent to said each actual stroke of said input handwritten character with an imaginary stroke to form said single line; and
   said smoothing device repositions said imaginary starting point and said imaginary ending point at a position closer to said actual stroke and an imaginary stroke linked to said imaginary starting point or imaginary ending point of said actual stroke.

41. A medium storing a computer-readable program for recognizing an input handwritten character, said program allowing a computer to perform the steps of:
   linking from an ending point of each actual stroke of said input handwritten character to a starting point of an actual stroke subsequent to said each actual stroke with an imaginary stroke to form a line;
   detecting a feature level for specifying a turn of said line;
   comparing said detected feature level with each feature level of a plurality of handwritten characters in a previously formed dictionary database to calculate a resemblance of said input handwritten character to each said handwritten character in said dictionary database; and
   determining as said input handwritten character a handwritten character in said dictionary database having said calculated resemblance closest to said input handwritten character.

42. The medium of claim 41, wherein said feature level includes a position of said turn.

43. The medium of claim 42, wherein said feature level includes at least one of a direction of said turn and an angle of said turn.

44. The medium of claim 43, wherein said step of detecting includes the step of identifying said direction of said turn depending on a plurality of predetermined reference directions.

45. The medium of claim 44, wherein said step of identifying includes the step of assuming as said direction of said turn one of said plurality of reference directions closest to said direction of said turn.

46. The medium of claim 44, wherein said step of identifying includes the step of assuming as said direction of said turn both two of said plurality of reference directions immediately adjacent to said direction of said turn.

47. The medium of claim 46, wherein said step of identifying further includes the step of weighting said angle of said turn depending on a proximity of each of said both two reference directions to said direction of said turn.

48. The medium of claim 42, further comprising the step of blurring said detected position of said turn after said step of detecting and before said step of comparing.

49. The medium of claim 48, wherein said step of blurring includes the step of providing a highest score to the said detected position of said turn and a lower score to a position more distant from said detected position of said turn.

50. The medium of claim 41, wherein each feature level of said handwritten characters in said dictionary database is calculated by averaging feature levels of a plurality of handwritten character samples by the number of said samples.

51. The medium of claim 41, further comprising the step of using said detected feature level of said input handwritten character to update a feature level of said determined handwritten character in said dictionary database.

52. The medium of claim 51, wherein said step of comparing compares said detected feature level with each feature level of said handwritten characters in said dictionary database without discriminating between said feature level for specifying said turn of said actual stroke and a feature level for specifying a turn between said actual stroke and said imaginary stroke.

53. The medium of claim 51, wherein said step of comparing compares said detected feature level with each feature level of said handwritten characters in said dictionary database after weighting said feature level for specifying said turn of said actual stroke with a first coefficient and weighting a feature level for specifying a turn between said actual stroke and said imaginary stroke with a second coefficient differing from said first coefficient.

54. The medium of claim 53, wherein said second coefficient is smaller than said first coefficient.

55. The medium of claim 51, wherein said step of comparing compares said detected feature level with each feature level of said handwritten characters in said dictionary database after weighting a feature level for specifying a turn between said actual stroke and said imaginary stroke having a first length with a first coefficient and weighting a feature level for specifying a turn between said actual stroke and said imaginary stroke having a second length longer than said first length with a second coefficient smaller than said first coefficient.

56. The medium of claim 41, further comprising the step of smoothing a portion linking said actual stroke and said imaginary stroke together.

57. The medium of claim 56, wherein the step of smoothing repositions a starting point and/or an ending point of said actual stroke at a position closer to said actual stroke and an imaginary stroke linked to said actual stroke starting point or ending point.

58. The medium of claim 57, wherein said step of smoothing includes the steps of:

- selecting a point on said actual stroke detected earlier and/or later than said actual stroke starting point and/or ending point by a predetermined period of time to calculate a distance from said actual stroke starting point and/or ending point to said point selected on said actual stroke;
- detecting a point on said imaginary stroke distant by said calculated distance from said imaginary stroke ending point and/or starting point linked to said actual stroke starting point and/or ending point; and
- using said point selected on said actual stroke and said point detected on said imaginary stroke to determine said closer position.

59. The medium of claim 57, said step of smoothing determines said closer position depending on a position of a point on said actual stroke distant from said actual stroke starting point and/or ending point by a predetermined distance and a point on said imaginary stroke distant by said predetermined distance from said imaginary stroke ending point and/or starting point linked to said actual stroke starting point or ending point.

60. The medium of claim 56, further comprising the step of extending said actual stroke and adding an imaginary starting point and an imaginary ending point, wherein:

- said step of linking links from said imaginary ending point of each actual stroke of said input handwritten character to said imaginary starting point of an actual stroke subsequent to said each actual stroke of said input handwritten character with imaginary stroke to form said line; and
- said step of smoothing repositions said imaginary starting point and said imaginary ending point at a position closer to said actual stroke and an imaginary stroke linked to said imaginary starting point or imaginary ending point of said actual stroke.

* * * * *